July 7, 1942. H. A. DELANO 2,288,793
SLING
Filed March 18, 1941
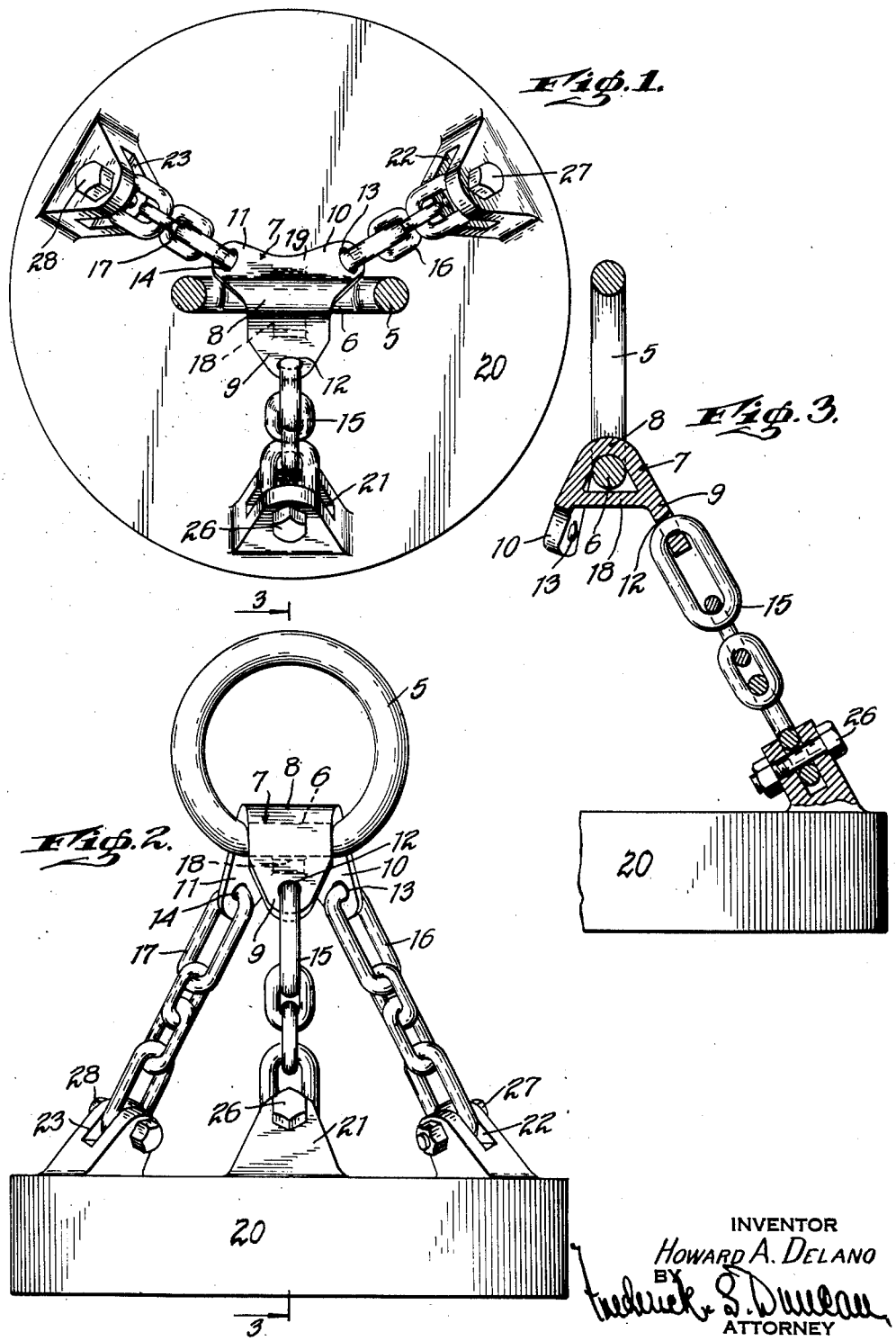
INVENTOR
HOWARD A. DELANO
BY
ATTORNEY Patented July 7, 1942

2,288,793

UNITED STATES PATENT OFFICE 2,288,793

SLING

Howard A. Delano, York, Pa., assignor to American Chain & Cable Company, Inc., New York, N. Y., a corporation of New York Application March 18, 1941, Serial No 383,915

4 Claims. (Cl. 294—78)

This invention relates to improvements in slings.

In slings of prior constructions including a suspension eye and depending portions comprising chain sections, the movement between the upper links of the chain sections and the suspension eye caused pounding between these links and the eye causing the eye to be worn and to fail and furthermore these links were connected to the suspension eye in single plane so that in the case where three such chain sections were employed and connected to an object to be hoisted by means of lugs spaced equi-angularly and located in the same plane, it was necessary to twist one or more of these chain sections and rotate adjacent links and the upper links and eyes out of right angular engagement, which caused a rasping or rubbing action between adjacent links and the upper links and eyes and also resulted in shortening these chain sections.

Among the objects of my invention are improved means whereby the above referred to objections are eliminated, such means comprising a yoke straddling the suspension eye and provided with as many depending legs as there are chain sections to be used, equi-distantly spaced from a common center line or axis of the yoke and having the same acute angular relation to said axis and spaced equi-angularly about said axis.

Other objects of the invention will appear from the following description taken in connection with the drawing, in which—

Fig. 1 is a top plan view of the sling, showing the suspension eye in horizontal section;

Fig. 2 is a side view of the sling; and

Fig. 3 is a vertical section on the line 3—3 of Fig. 2.

The sling disclosed comprises a suspension eye 5 preferably formed so as to provide a lower horizontally extending straight portion 6 for supporting a yoke 7 to which depending chain sections are connected. The body 8 of the yoke is curved in one direction and straight at right angles thereto to conform to the shape of the lower straight portion 6 of the suspension eye. Depending from the body of the yoke are three legs 9, 10, and 11, which make the same angle with a line or axis passing vertically centrally through the body and in the particular disclosure make an angle of 30° with said axis. The legs are spaced 120° apart about said axis and when of rectangular cross section as disclosed, are arranged tangentially with the surface of a truncated cone whose axis coincides with the axis of the yoke. The lower ends of the legs are provided with holes 12, 13 and 14 in which the upper links of depending chain sections 15, 16 and 17 are connected, the holes having their projected axes intersect at the axis of the yoke and at an angle of 60° with said axis.

For the purpose of holding the yoke seated on the lower straight portion 6 of the suspension eye and of limiting the amount of relative vertical movement between the yoke and eye, a bar 18 may be connected as by welding to the leg 9 and to a web 19 connecting the legs 10 and 11. The yoke itself may be cast or if desired may be formed in some other manner.

The yoke disclosed is particularly useful in a sling for raising and lowering a heavy lifting magnet diagrammatically illustrated at 20 and which is provided with pairs of lugs 21, 22, and 23 provided with apertures extending parallel with the holes in the legs of the yoke, and to which the lower end links of the chain sections are connected by bolts 26, 27, and 28, the pairs of lugs lying in the same horizontal plane and being spaced 120° apart and extending in planes parallel with the planes in which the legs of the yoke lie. The parts are so proportioned that each chain section and the leg of the yoke to which it is connected lie in straight line when the magnet is raised. The lower end links may be provided with cross members as shown to limit their movement on the connecting bolts.

While I have disclosed and described with particularity a sling adapted for a particular purpose, it is to be understood that I reserve the right to such changes as fall within the principles of my invention and the scope of the appended claims.

I claim:

1. In a sling comprising a suspension eye and three depending flexible sections adapted to be secured to an object to be lifted, at three equi-angularly spaced points, and a yoke of saddle-like construction having a central body shaped to fit the lower section of said suspension eye and provided with three depending legs to which said flexible sections are connected, one of said legs being located on one side of said eye and the others on the opposite side of said eye, and said legs making the same angle with a vertical line or axis through the center of said body and being spaced equi-angularly about said axis, said legs and flexible sections being of such combined lengths that corresponding legs and sections lie in straight lines as said object is lifted.

2. A sling comprising a suspension eye of generally circular form and having a lower straight yoke supporting portion, a yoke having a body conforming to the shape of said lower straight portion of said eye and seated thereon, said yoke being provided with three depending legs making the same angle with a vertical line or axis through the center of said body and spaced equi-angularly about said axis, and depending flexible sections connected to said legs and adapted to be connected to an object to be lifted.

3. In a sling comprising a suspension eye and three depending flexible sections adapted to be connected to an object to be lifted, of a yoke for connecting said flexible sections to said eye, comprising a body seated on the lower section of said eye, three legs depending from said body, one leg located on one side of said eye and the other two on the opposite side of said eye, and a web connecting said two legs.

4. In a sling comprising a suspension eye, three depending flexible sections adapted to be connected to an object to be lifted and a yoke for connecting said sections to said eye, said yoke being provided with a body seated on the lower section of said eye and with three depending legs, one leg located on one side of said eye and the other two on the opposite side of said eye, a web connecting said two legs, and a cross member connected to said web and to said first mentioned leg to limit the downward movement of said eye in said yoke.

HOWARD A. DELANO.